United States Patent [19]
Richied et al.

[11] Patent Number: 5,941,080
[45] Date of Patent: Aug. 24, 1999

[54] THIN-WALLED CRYOSTAT

[75] Inventors: Donald E. Richied, Maple Park; Richard K. Applegate, Yorkville, both of Ill.

[73] Assignee: Illinois Superconductor Corporation, Mt. Prospect, Ill.

[21] Appl. No.: 08/831,175

[22] Filed: Apr. 2, 1997

[51] Int. Cl.[6] ............................................. F17C 1/00
[52] U.S. Cl. ................................... 62/45.1; 62/51.1
[58] Field of Search ................................ 62/45.1, 51.1

[56] References Cited

U.S. PATENT DOCUMENTS

| | | | |
|---|---|---|---|
| 2,994,452 | 8/1961 | Morrison | 62/45.1 |
| 3,200,881 | 8/1965 | Bucks et al. | 62/51.1 |
| 3,904,067 | 9/1975 | Kuniyasu et al. | 62/51.1 |
| 4,152,903 | 5/1979 | Longsworth | 62/222 |
| 4,481,778 | 11/1984 | Reinker et al. | 62/45 |
| 4,496,073 | 1/1985 | Silver et al. | 220/445 |
| 4,526,015 | 7/1985 | Laskaris | 62/514 |
| 4,625,229 | 11/1986 | Maier | 357/81 |
| 4,712,388 | 12/1987 | Sullivan et al. | 62/514 |
| 4,713,941 | 12/1987 | Toyoda et al. | 62/51.1 |
| 4,739,633 | 4/1988 | Faris | 62/514 |
| 4,805,420 | 2/1989 | Porter et al. | 62/51.1 |
| 5,083,105 | 1/1992 | Herd et al. | 335/216 |
| 5,248,365 | 9/1993 | Kamioka et al. | 156/256 |
| 5,321,955 | 6/1994 | Leonard | 62/51.1 |
| 5,387,889 | 2/1995 | Maeda et al. | 335/216 |
| 5,471,844 | 12/1995 | Levi | 62/51.1 |
| 5,590,538 | 1/1997 | Hsu et al. | 62/51.2 |
| 5,651,256 | 7/1997 | Herd et al. | 62/45.1 |

*Primary Examiner*—Ronald Capossela
*Attorney, Agent, or Firm*—Marshall, O'Toole, Gerstein, Murray & Borun

[57] ABSTRACT

A cryostat includes an upper shell and a lower shell connected along a seam. The shells are made of a relatively thin material which would be subject to collapse once the cryostat is evacuated. In order to resist collapsing forces, a brace is placed inside the cryostat between opposing walls of the shells. The brace has a connecter which includes a pin and post that has an opening for receiving the pin. The connectors allow easy assembly and disassembly of the cryostat while still resisting compressive forces.

17 Claims, 5 Drawing Sheets

THIN-WALLED CRYOSTAT

FIELD OF THE INVENTION

The present invention relates generally to cryostats for maintaining devices at very low temperatures, and more particularly to cryostats which are evacuated and therefore require structure to prevent the cryostat from collapsing.

BACKGROUND OF THE INVENTION

Many electronic or electromagnetic devices achieve superior performance characteristics when those devices are cooled to very low temperatures. For instance, it is known that some amplifiers will produce little noise if they are cooled to liquid nitrogen temperatures (77 K). Devices incorporating superconducting materials must also be maintained at very low temperatures (generally below 92 K) to maintain their superconducting properties.

In order to maintain the devices at low temperatures, some type of cryorefrigerator must be provided. If a source of liquid nitrogen is available, it may be pumped in coils adjacent the device to provide cooling. Other types of cryorefrigerators are commercially available which pump a fluid in a continuous loop to cool the electronic or electromagnetic devices. In order to minimize the amount of heat from the environment which can be transferred to the electronic or electromagnetic device, an enclosure or cryostat is placed around the device and the cooling coils. Supports are placed in the cryostat which utilize the strength of the cryostat walls to mount the devices inside the cryostats. The cryostats are often evacuated of any gaseous material, thereby reducing convection heating which might occur between the enclosure and the cooled device. Insulation may also be placed inside the cryostat to minimize heat transfer.

When the cryostat is evacuated, it is necessary to design the enclosure to withstand the significant forces which would otherwise cause the enclosure to collapse. Cryostats are, therefore, generally made of a relatively thick metal which has the strength to resist collapsing. The precise thickness required to prevent collapsing depends on the material chosen and the size of the enclosure.

The use of thick-walled structures for cryostats, however, has numerous disadvantages. First, thick-walled structures require a relatively large amount of material, and are therefore expensive. Second, since cryostats are generally made of metal, the large amount of material results in a heavy structure, making it difficult to install or unsuitable for certain applications. Third, the use of such thick material may make working with the cryostat difficult.

SUMMARY OF THE INVENTION

In accordance with one aspect of the present invention, a cryostat includes a relatively thin-walled outer enclosure where the enclosure is sealed and evacuated. A cooled device is supported inside and offset from the enclosure, and is cooled by a cooling system. A brace inside the enclosure has contact areas where the contact areas contact the enclosure to prevent the enclosure from collapsing inward.

The cooled device may be supported by the brace. The cooled device may also include a rigid housing, and the brace may include posts contacting the housing on opposite sides of the housing to support the cooled device and resist collapsing forces on the enclosure.

The brace may include a plate adjacent to and generally parallel with a surface of the enclosure. The plate may have corners and may contact the enclosure only at the corners of the plate.

The brace may include a post having base portions connected by a sleeve. The brace may also include a first plate and insulated cap assemblies, where the cap assemblies are adjacent the enclosure and the first plate supports the cooled device. The brace may include a second plate adjacent to and generally parallel with a first surface of the enclosure, and a third plate adjacent to and generally parallel with a second surface of the enclosure. The first plate with the cap assemblies extends from the second plate to the third plate.

In accordance with another aspect of the present invention, a cryostat includes a first shell and a second shell, where the first shell and second shell mate along a seam to seal the cryostat for evacuation. A cooled device is supported inside and offset from the cryostat, and is cooled by a cooling system. A brace in the cryostat extends from the first shell to the second shell to prevent the cryostat from collapsing when the cryostat is evacuated. The brace includes a connector which resists collapsing forces on the cryostat, but does not resist separation of the first shell from the second shell. The connector may include a pin extending from a plate and a post have a channel for receiving the pin.

Other features and advantages are inherent in the thin-walled cryostat claimed and disclosed or will become apparent to those skilled in the art from the following detailed description in conjunction with the accompanying drawings.

DETAILED DESCRIPTION OF THE PREFERRED EMBODIMENT

Figure 1:
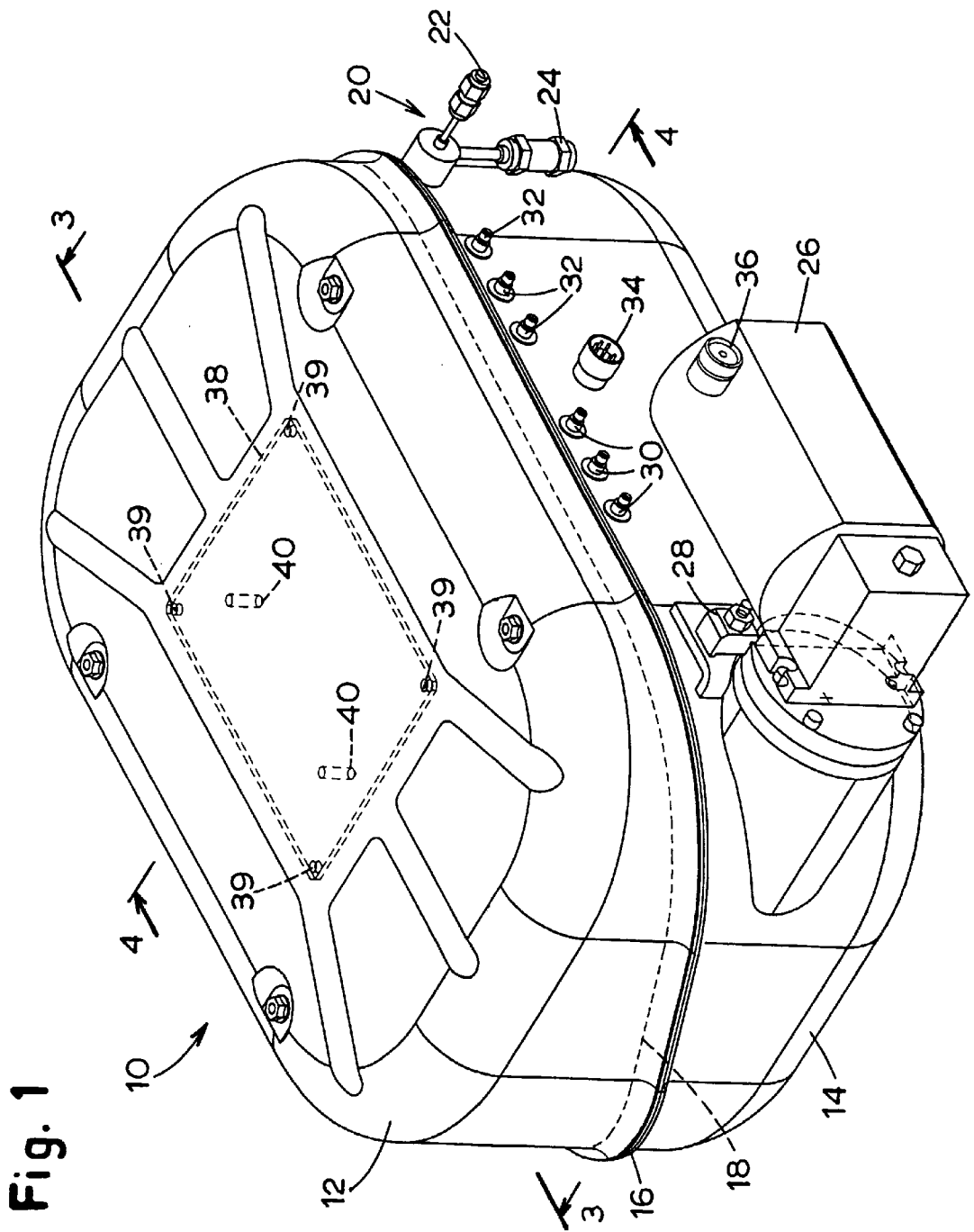
FIG. 1 is a perspective view of a cryostat of the present invention.

Referring initially to FIG. 1, a cryostat 10 of the present invention includes an enclosure having an upper shell 12 and a lower shell 14. The upper shell 12 and lower shell 14 contact along a seam 16 onto which a weld is applied to form a seal between the upper shell 12 and the lower shell 14. As seen in phantom, the upper shell 12 has a thin rim 18 attached adjacent the seam 16, which protects components inside the cryostat 10 from heat when the seam 16 is welded to form the seal.

The cryostat 10 has two cooling systems. The first cooling system includes a liquid nitrogen assembly 20 having an inlet 22 and an outlet 24. The liquid nitrogen assembly 20 can be used on a continuous basis or simply for a rapid cool down of the components inside the cryostat 10, when those components are at room temperature. The liquid nitrogen assembly 20 is sealed to the lower shell 14 in order to prevent air from passing into or out of the cryostat 10. The second cooling system for the cryostat 10 is the cold head 28, which is also sealed to the lower shell 14 by a clamp assembly 28. A variety of cold heads may be used, including a model M22 manufactured by CTI of Mansfield, Mass.

Attached to the lower shell 14 are three signal inputs 30 and three signal outputs 32. The precise number of inputs and outputs needed will, of course, depend on the components which are housed in the cryostat 10. Located adjacent the inputs 30 and outputs 32 is an electrical connector 34, which is used to connect with various structures inside the cryostat 10. Such structures might include temperature sensors or heaters to precisely control the temperature at various sites within the cryostat 10. A suction port 34 is also attached to the lower shell 14 and is used to evacuate the cryostat 10 once it has been sealed. Evacuation of the cryostat minimizes heat transfer from the shells 12 and 14 of the cryostat to the cooled components located inside.

The upper shell 12 and lower shell 14 can be constructed of a variety of materials, but are preferably made from 10 gauge stainless steel (0.90 in.), when the cryostat has dimensions of approximately 9¾ in. by 21 in. by 15 in. Because the cryostat has relatively thin walls with respect to its overall size, the cryostat 10 requires one or more bracing structures to prevent the cryostat from collapsing when it has been evacuated. Such bracing structures include an upper plate 38, which is attached to the upper shell 12. The upper plate 38 is only attached to the upper shell 12 at the corners of the upper plate 38 so that heat conduction from the shell through the plate will have relatively limited heat-flow pathways. The upper plate 38 includes two pins 40, which are disposed downwardly into the cryostat 10. The corners of the upper plate 30 have holes 39 drilled into them in order to minimize heat transfer from the upper shell 12, to the upper plate 38, through the welds at those corners. The holes 39 may also be used as locators for the shell.

Figure 2:
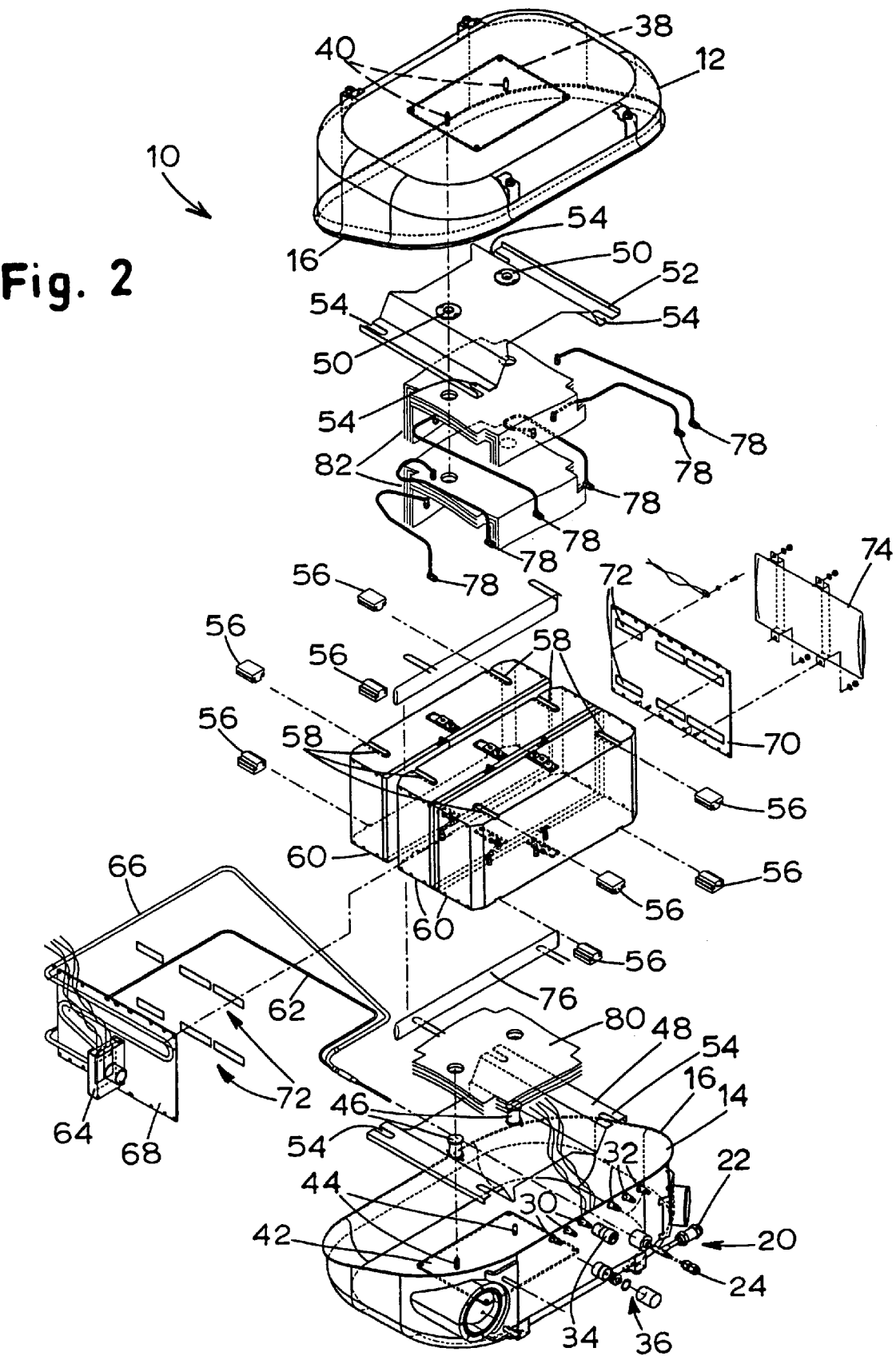
FIG. 2 is an exploded view of a first embodiment of a cryostat of the present invention.

As can be seen in FIG. 2, the lower shell 14 has a lower plate 42 similar to upper plate 38. Lower plate 42 has pins 44 projecting upward into the cryostat 10. The pins 44 are used to center posts 46 which receive the pins and are attached to a lower motion control plate 48. Similarly, the pins 40 center posts 50 attached to an upper motion control plate 52. Each motion control plate has slots 54 into which spacers 56 fit.

The spacers 56 also fit into slots 58 in the housings of filter packs 60. Although filter packs 60 are shown, the cryostat is capable of being used with any device which needs to be cooled, including, for instance, Spectrum Master™ filters made by Illinois Superconductor Corporation.

As also can be seen in FIG. 2, the liquid nitrogen assembly is attached to an input tube 62, which is connected to a thermal coupling device 64. As the liquid nitrogen reaches the thermal coupling device, the liquid nitrogen expands to absorb any heat in the cryostat and then is returned through outlet tube 66 to the liquid nitrogen assembly 20 and outlet 24. The inlet tube 62, outlet tube 66, and thermal coupling device 64 are connected to a plate 68, which is then bolted to the filter packs 60. A similar plate 70 on the opposite side of filter packs 60 is also bolted to the filter packs 60. Indium solder 72 may also be used to attach the plates 68 and 70 to the filter packs 60, and to help provide a flow path to draw heat away from the filter packs 60 to the thermal coupling device 64.

A large getter 74 and two smaller getters 76 are mounted around the filter packs 60. Getters absorb any gases in the cryostat which might be drawn out of the metals and composite components inside the cryostat, thus helping to keep as complete a vacuum in the cryostat as possible. The getters may be of the molecular sieve type to absorb water or oxygen, or may include palladium oxide to absorb hydrogen. Several cables 78 are also located in the cryostat and are used to connect the signal inputs 30 or signal outputs 32 to the filter packs 60.

The cryostat 10 contains bats of superinsulation, such as insulation 80, just above the lower motion control plate 48, and insulation 82, just below the upper motion control plate 52. The insulation is multi-layered mylar and metallic film which has a high resistance to heat flow when located in a vacuum. Several other bats of insulation (not depicted) will also be placed in the cryostat 10, for instance, above the upper motion control plate 52, below the lower motion control plate 48, and all around the sides of the cryostat 10.

Figure 3:
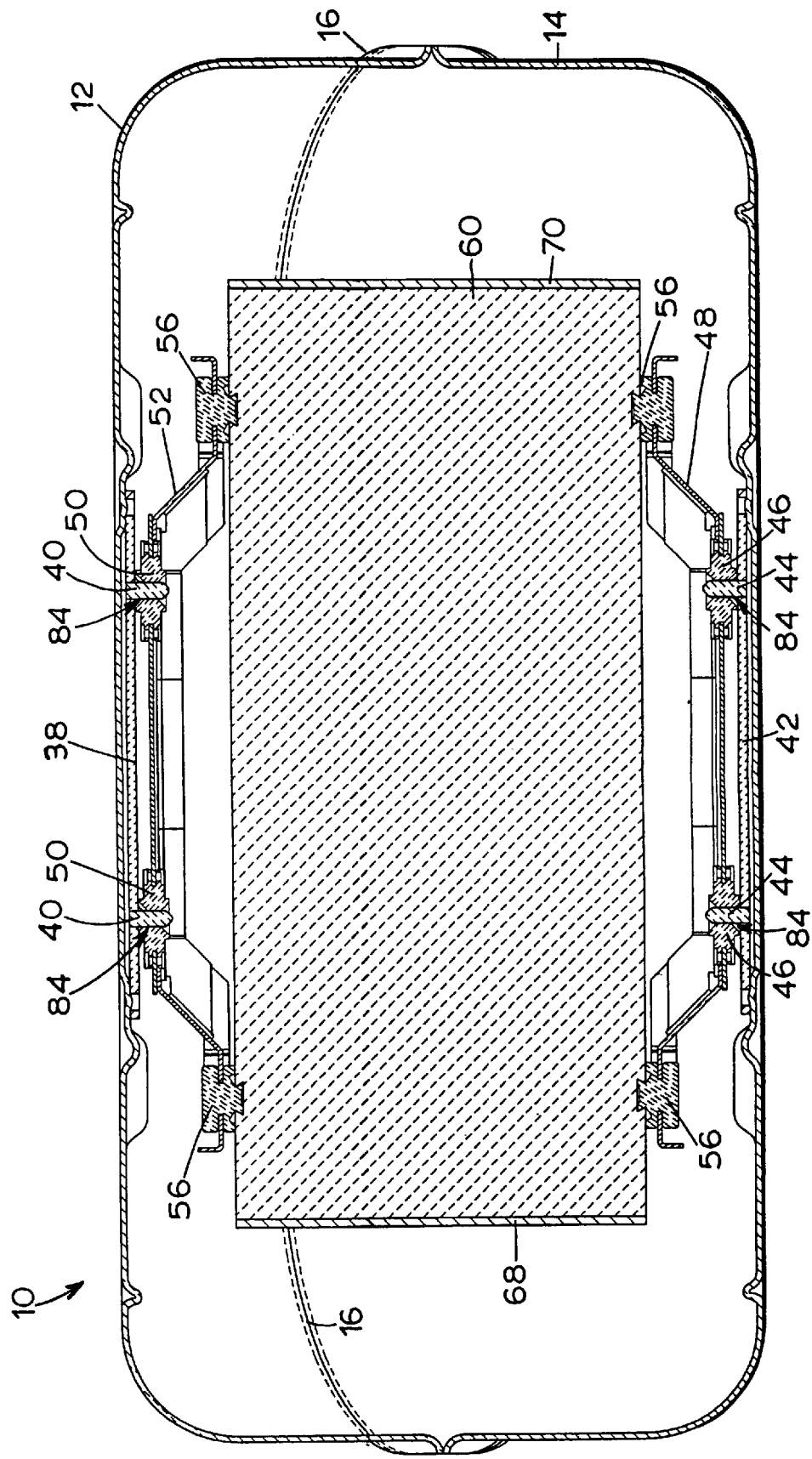
FIG. 3 is a sectional view taken along the line 3—3 of FIG. 1 of the first embodiment of a cryostat of the present invention.

Referring now to FIG. 3, it can be seen that this embodiment of the present invention utilizes the rigid housing of the filter packs 60 as part of the brace to prevent the walls of the cryostat from collapsing. For clarity, FIG. 3 omits the insulation, cooling apparatus, and electrical connections shown in FIG. 2. Any collapsing force is transmitted through the upper shell 12, to the upper plate 38, and through to the post 50, which are centered inside channels 84 by the pins 40. The posts 50 are made of a relatively non-thermally conductive material such as Ultem, sold by General Electric, in order to minimize heat transfer between the plate 38 and the upper motion control plate 52. Force is then transferred from the posts 50, to the upper plate 52, and on to the spacers 56 mounted on the filter packs 60. The spacers 56 are also made of a material with a low thermal conductivity such as Ultem. Force is then transferred from the filter pack 60, through the spacers 56, attached to the lower motion control plate 48, to the posts 46 centered by the pins 44 in channels 84, to the lower plate 42, and through to the walls of the lower shell 14. In this way, any compressive force from outside the cryostat 10 is met with an opposite force from inside the cryostat to prevent collapse. This design also has the advantage that the structure used as the brace to prevent collapse mounts the filter pack 60 inside the cryostat 10 so that the filter packs 60 are spaced from the walls of the cryostat.

Figure 4:
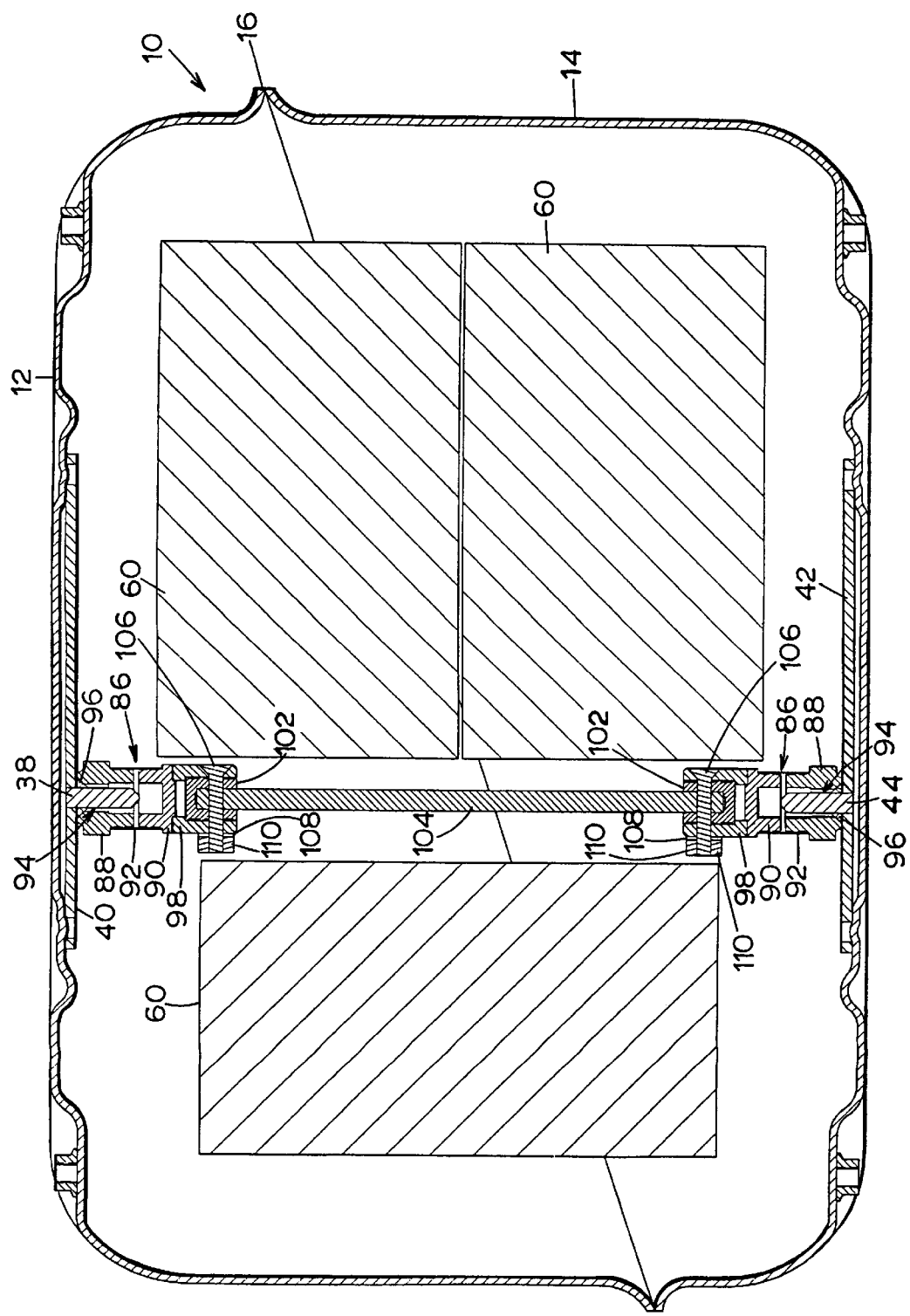
FIG. 4 is a sectional view taken along the line 4—4 of FIG. 1 of a second embodiment of a cryostat of the present invention.

Referring now to FIG. 4, a second embodiment of the present invention uses a different brace in order to prevent the cryostat from collapsing. Like the first embodiment, the embodiment of FIG. 4 includes an upper shell 12 and a lower shell 14 connected along a seam 16. A top plate 40 includes pins 38 (only one pin is depicted in FIG. 4), and a lower plate 42 has pins 44 (only one pin 44 is depicted in FIG. 4). The plates 40 and 42 are in contact with the upper shell 12 and lower shell 14, respectively, only at the corners of the plates. The pins 40 and 42 are designed to fit into posts 86.

Figure 5:
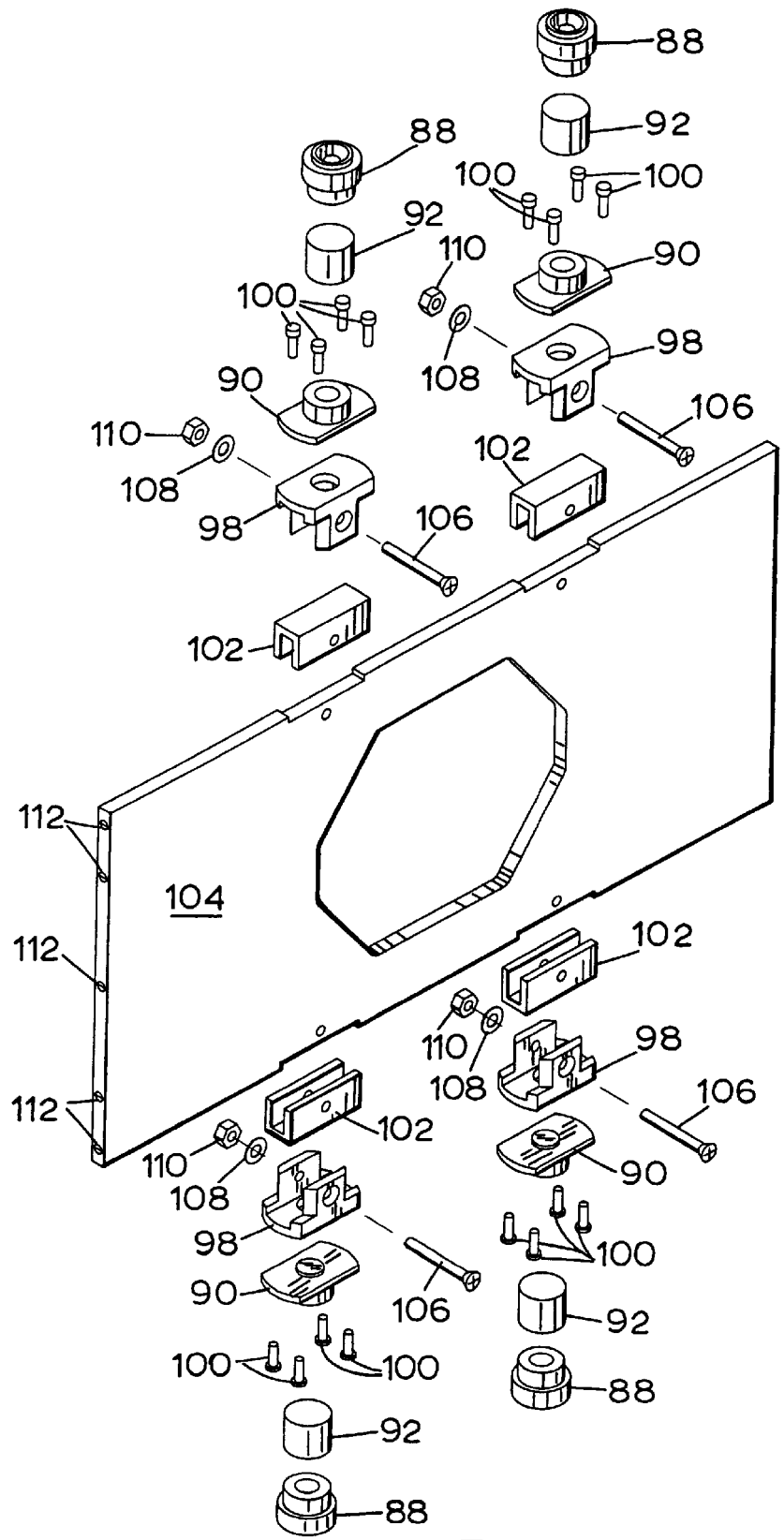
FIG. 5 is an exploded perspective view of the brace of the cryostat of FIG. 4.

As seen in FIGS. 4 and 5, each post 86 has a first base 88 and a second base 90 connected by a stainless steel support tube 92. The first base 88 has a channel indicated generally at 94 into which pins 38 or pins 44 are placed. The first base 88 and second base 90 are made of Ultem in order to minimize heat transfer. Similarly, the support tube 92 is made relatively thin in order to provide less of a path through which heat may travel. A gasket 96 may be placed around the pins 38 or pins 44 in order to minimize movement of the pins with respect to the posts 86.

Each second base 90 is attached to a stainless steel support pad 98 by screws 100 (FIG. 5). Inside the support pad is a saddle 102 which is made of a thermal insulator. Each saddle 102 fits over a plate 104 and, each support pad 98 and saddle 102 is secured to the plate 104 by bolts 106, washers 108, and nuts 110. As seen in FIG. 5, at the end of the plate 104 are several threaded openings 112 for attaching plates (not depicted) perpendicular to the plate 104. The perpendicular plates of the embodiment of FIGS. 4 and 5 are similar to plates 68 and 70 shown in FIG. 2. The plates perpendicular to plate 104 have openings for attachment of the filter packs 60 as seen in FIG. 4.

The cryostat of FIGS. 4 and 5 prevents collapse of the upper shell 12 and lower shell 14 by transferring forces through the upper plate 40 or lower plate 42 to the plate 104 through the cap assemblies on the plate 104. Each cap assembly includes a post 86, a support pad 98, and a saddle 102. Thus, unlike the embodiments of FIGS. 2 and 3, the embodiment of FIGS. 4 and 5 does not utilize the housings of the filter packs 60 as part of the brace. However, the brace does serve to support the filter packs 60 in the cryostat just as the brace in FIGS. 2 and 3 does.

The cryostat of the present invention has several advantages over previous thick-walled cryostats. Because the upper shell 12 and lower shell 14 are made of relatively thin material, the cryostat is lighter, less expensive, and easier to work with than thick-walled designs. The brace inside the cryostat does have the drawback that it provides a heat-flow path from the shells 12 and 14 to the interior of the cryostat adjacent the filter pack 60. However, the brace is designed with a serpentine heat-flow path which is interrupted in at least two areas by a low thermally conductive material.

The designs of the braces as shown are also advantageous because they allow easy assembly of the components inside the cryostat 10. When assembling the cryostats of the present invention, all components may be placed into the lower shell 14, and then the upper shell 12 may be lowered onto the lower shell 14 while the pins 38 attached to the upper plate 40 are inserted into the posts 50 (FIGS. 2 and 3) or posts 86 (FIGS. 4 and 5). The pins and posts serve as a connecter for the brace which resists compressive forces once the pins are fully inserted into the posts, but permits separation of the shells. This type of connecter not only permits easy assembly, but also easy separation of the shells if it becomes necessary to open the cryostat 10 to service the components.

The foregoing detailed description has been given for clearness of understanding only, and no unnecessary limitation should be understood therefrom, as modifications would be obvious to those skilled in the art.

We claim:

1. A cryostat comprising:
   a relatively thin-walled outer enclosure, wherein the enclosure is sealed and evacuated;
   a cooled device supported inside and offset from the enclosure;
   a cooling system for cooling the cooled device; and
   a brace inside the enclosure having contact areas, wherein the contact areas contact the enclosure to prevent the enclosure from collapsing inward.

2. The cryostat of claim 1 wherein the cooled device is supported by the brace.

3. The cryostat of claim 1 wherein:
   the cooled device includes a rigid housing; and
   the brace includes posts contacting the housing on opposite sides of the housing to support the cooled device and resist collapsing forces on the enclosure.

4. The cryostat of claim 1 wherein the brace includes a plate adjacent to and generally parallel with a surface of the enclosure.

5. The cryostat of claim 4 wherein the plate has corners and the plate contacts the enclosure only at the corners of the plate.

6. The cryostat of claim 1 wherein the brace comprises a post having base portions connected by a sleeve.

7. The cryostat of claim 1 wherein:
   the brace comprises a first plate and insulated cap assemblies;
   the cap assemblies are adjacent the enclosure; and
   the first plate supports the cooled device.

8. The cryostat of claim 7 wherein:
   the braces comprise a second plate adjacent to and generally parallel with a first surface of the enclosure and a third plate adjacent to and generally parallel with a second surface of the enclosure; and
   the first plate with the cap assemblies extend from the second plate to the third plate.

9. A cryostat comprising:
   a first shell;
   a second shell, wherein the first shell and second shell mate along a seam to seal the cryostat for evacuation;
   a cooled device supported inside and offset from the cryostat;
   a cooling system for cooling the cooled device; and
   a brace in the cryostat extending from the first shell to the second shell to prevent the cryostat from collapsing when the cryostat is evacuated;
   wherein the brace comprises a connector which resists collapsing forces on the cryostat but does not resist separation of the first shell from the second shell.

10. The cryostat of claim 9 wherein the connector comprises:
    a pin extending from a plate; and
    a post having channel for receiving the pin.

11. The cryostat of claim 9 wherein the cooled device is supported by the brace.

12. The cryostat of claim 9 wherein:
    the cooled device includes a rigid housing; and
    the brace includes posts contacting the housing on opposite sides of the housing to support the cooled device and resist collapsing forces on the enclosure.

13. The cryostat of claim 9 wherein the brace includes a plate adjacent to and generally parallel with a surface of the enclosure.

14. The cryostat of claim 13 wherein the plate has corners and the plate contacts the enclosure only at the corners of the plate.

15. The cryostat of claim 9 wherein the brace comprises a post having base portions connected by a sleeve.

16. The cryostat of claim 9 wherein:
    the brace comprises a first plate and insulated cap assemblies;
    the cap assemblies are adjacent the enclosure; and
    the first plate supports the cooled device.

17. The cryostat of claim 16 wherein:
    the braces comprise a second plate adjacent to and generally parallel with a first surface of the enclosure and a third plate adjacent to and generally parallel with a second surface of the enclosure; and
    the first plate with the cap assemblies extend from the second plate to the third plate.

* * * * *